UNITED STATES PATENT OFFICE.

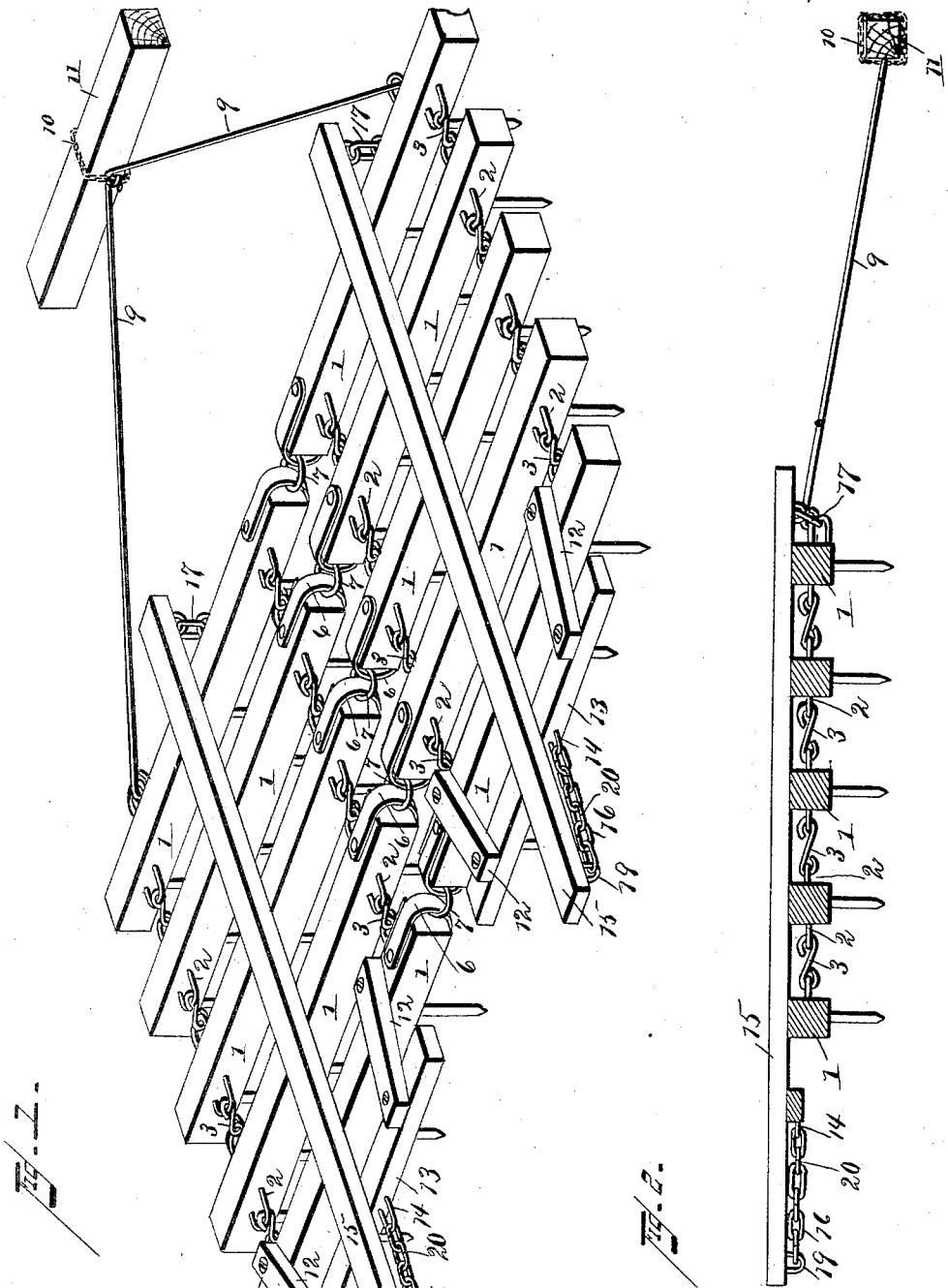

STEPHEN MORRIS, OF JERICO SPRINGS, MISSOURI.

HARROW.

SPECIFICATION forming part of Letters Patent No. 442,131, dated December 9, 1890.

Application filed July 9, 1890. Serial No. 358,205. (No model.)

*To all whom it may concern:*

Be it known that I, STEPHEN MORRIS, a citizen of the United States, residing at Jerico Springs, in the county of Cedar and State of Missouri, have invented a new and useful Automatic Double-Tension Adjustable Harrow, of which the following is a specification.

This invention has relation to harrows; and the objects of the invention are to provide a harrow adapted to be adjusted so as to be flexible or rigid, as may be desired, and to perform the functions of such flexible or rigid harrows when so adjusted.

With the above general objects in view the invention consists in certain features of construction hereinafter specified, and particularly pointed out in the claim.

In the drawings, Figure 1 is a perspective of a harrow constructed in accordance with my invention. Fig. 2 is a longitudinal section through one of the harrow-sections and at one side of one of the tension-bars.

Like numerals of reference indicate like parts in both the figures.

In practicing my invention I construct the harrow in each instance with two separate sections. Each of the sections consists of a series of harrow bars or beams 1, provided at opposite sides near their ends with staples 2, the adjacent staples of succeeding bars being connected by loose links 3. In this manner the sections are made flexible and adapted for harrowing uneven ground. The inner ends of each of the bars of each section are provided with loops 6, the loops of two adjacent bars of the sections being flexibly connected by means of links or rings 7. The rear bar of each harrow-section is provided with a staple 8, and in each staple is loosely connected the forward end of the pair of rearwardly-disposed metallic rods 9. These rods converge at their rear ends and connect with a chain 10, which encircles a drag-bar 11. From the two front bars of the harrow-section project short bars 12, connected at their front ends by transverse bars 13. From the front ends of the bars 13 project staples 14, a staple being located at the central front edge of each of said bars 13.

15 designates tension-bars, which are connected at their front ends by chains 16 to the staples 14, the rear ends of said bars overlapping the rear ends of the sections to which they are attached and being loosely connected to their sections by means of loose interlocking staples 17, secured in the rear ends of the tension-bars and the rear harrow-bars. By adjusting the chain 16 so that different links will connect with staples 19 the tension of the bars 15 upon the harrow-bars will be increased or diminished, so that the harrow-sections will be transformed from flexible sections to rigid sections.

In operation the harrow-sections take at each side of a hill, thoroughly harrowing the same in a similar manner as do harrows of this class, and in passing over uneven ground the flexibility of the sections permits them to yield to the undulations of the surface, thus thoroughly harrowing the surface. When, however, it is desired to employ a rigid harrow, the chains 16 are drawn taut and connected to the staples 19 of the bars 15. The bars 15 are thus pressed snugly upon the upper surfaces of the harrow-bars, over which they pass, and the harrow-bars are thus as rigidly connected as if they were formed in a rigid frame. Different degrees of tension may be secured between the harrow-bars and the tension-bars by connecting various links of the chains 16 to the staples 19. To secure such adjustment, I prefer to construct the chains of split links 20, as shown, whereby they may be readily attached and adjusted.

Having thus described my invention, I claim—

The opposite flexible sections consisting of the transverse harrow-bars 1, loosely connected by the links 3, the U-shaped metal straps 6, connected to the inner end of each harrow-bar, the rings 7, engaging and connecting each pair of straps, in combination with the front extensions secured to the front bar of each section, the opposite longitudinal bars 15, links connecting their rear ends to the rear bars of the sections, adjustable chains connecting their front ends to the front extensions of the sections, the rods loosely connected at their front ends to the rear bars of the series and converged at their rear ends, and the drag-bar 11, connected at
5 its center to the rear ends of the rods, substantially as specified.

In testimony that I claim the foregoing as my own I have hereto affixed my signature in presence of two witnesses.

STEPHEN MORRIS.

Witnesses:
J. M. METZ,
GEORGE CLARK.